UNITED STATES PATENT OFFICE.

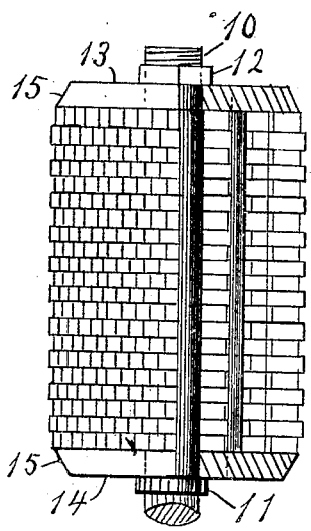

LEO M. HARVEY, OF LOS ANGELES, CALIFORNIA.

REVOLVING TOOL.

1,354,828.   Specification of Letters Patent.   Patented Oct. 5, 1920.

Application filed June 16, 1919. Serial No. 304,631.

*To all whom it may concern:*

Be it known that I, LEO. M. HARVEY, a citizen of the United States, residing at the city of Los Angeles, county of Los Angeles, State of California, have invented new and useful Improvements in Revolving Tools, of which the following is a specification.

The object of my invention is to provide a tool of detachable parts whereby the size and external configuration of the tool can be easily changed and parts can be replaced when broken or worn out.

In the drawings forming a part of this application, I have shown my tool as a revolving rasp, and will describe that construction which is also applicable to the formation of other tools, such as cutter heads.

Figure 1 is a side elevation partly in section of my improved rasp. Fig. 2 is a side view of the heads and rasp ring carrying bolts detached. Fig. 3 is a plan of one of the heads. Fig. 4 is a side view of a rasp ring in which the center of the bolt lugs openings are in a radial line that passes through the top of the tooth. Fig. 5 is a side view of a rasp ring in which the center of the bolt lugs openings are in a radial line that passes midway between the tops of two adjacent teeth.

Referring to the drawings 10 is a mandrel which has a collar 11 and a nut 12 with which the heads 13 and 14 of the rasp contact when the parts are assembled. Heads 13 and 14 are alike and only one will be described. Head 13 consists of a circular plate having preferably a beveled edge 15 and a central hole 16 through which the mandrel passes. In the face which opposes the other head are sockets 17 in which the ends of the ring carrying bolts 18 are received. There are any desired number of these sockets. I have shown three, as in the rasp used by me, that number I found satisfactory. In cutter heads more sockets would be desirable if the work is heavy. Mounted upon these bolts are the rasp rings 19 which are formed by stamping them out of sheet metal. In the exterior surface are teeth 20 which are fine or coarse according to the work desired.

I prefer to be able to make all rasp rings with one die. To do this the teeth and bolt lugs are arranged as follows: These teeth are of any desired number that is divisible by three but not by six. On the inner surface of rings 19 are six equal spaced bolt lugs 21 which are marked $a$, $b$, $c$, $d$, $e$, and $f$. By placing the alternate rings so that the bolts pass through lugs $a$ $c$ and $e$, and the other rings so that the bolts pass through lugs $b$ $d$ and $f$ the teeth of the rasp will be staggered and arranged in spiral rows longitudinally as shown in Fig. 1. The teeth and bolt lugs may be arranged differently but in such case it will require two sets of dies to stamp the rasp rings. In this construction there may be as many teeth and bolt lugs as desired. The bolt lugs are evenly spaced and in one set of rings, the center of the starting bolt lug would register with top of a tooth. In the companion rasp rings the center of a starting bolt lug would be on a line midway between the top of two teeth. By making up the rasp of alternate rings the staggered effect of the teeth is produced. There would be as many bolt sockets in each head as there are bolts to be used. By making holes in the heads and screw threading those in one head and providing heads on one end, and threads on the other of the bolts the rings and heads could be secured together.

In assembling a head is placed on the mandrel and the ring bolts placed in the sockets. The rasp rings are then positioned. The other head is then positioned and the nut placed on the end of the mandrel and screwed to place which securely unites the parts of the rasp. Should there be uneven wear on the rasp rings it is obvious that their position can be quickly changed, and if any ring breaks a new one can be put in. By changing the length of the mandrel and ring bolts a longer or shorter rasp can be made. Cutter heads for making moldings can be constructed in like manner. By this construction a tool is provided in which the wearing portions are easily and cheaply made and easily put in or taken out of their working positions and the other parts will wear indefinitely.

Having described my invention I claim:—

1. A revolving tool comprising a mandrel having a nut and a collar; heads having sockets in their opposed faces on said mandrel; bolts in said sockets and extending between said heads, and cutting rings having bolt lugs mounted on said bolts, said cutting rings having teeth in their periphery, the number of which is divisible by three but not by six, said bolt lugs being on the inner surface of said rings and consisting of six equal spaced lugs.

2. In a revolving tool, cutting rings having six equal spaced bolt receiving lugs on their inner surface, said cutting teeth being of any desired number that is divisible by three but not by six and cutting teeth on their outer surface.

3. In a revolving tool a cutter head composed of cutting rings having teeth on their periphery and lugs on their inner edges, the lugs on the odd numbered rings being radial to the top of a tooth, and the lugs of the even numbered rings being radial to a point half the distance between the tops of two consecutive teeth; bolts adapted to fit into said lugs and heads having holes adapted to receive the ends of said bolts.

In witness that I claim the foregoing I have hereunto subscribed my name this 11th day of June, 1919.

LEO. M. HARVEY.

It is hereby certified that in Letters Patent No. 1,354,828, granted October 5, 1920, upon the application of Leo M. Harvey, of Los Angeles, California, for an improvement in "Revolving Tools," errors appear in the printed specification requiring correction as follows: Page 2, line 5, claim 2, commencing with the word "said" strike out all to and including the word "six," line 7; same page and claim, line 8, after the word "surface" insert the clause *said cutting teeth being of any desired number that is divisible by three but not by six;* and that the said Letters Patent should be read with these corrections therein that the same may conform to the record of the case in the Patent Office.

Signed and sealed this 30th day of November, A. D., 1920.

[SEAL.]

L. B. MANN,
*Acting Commissioner of Patents.*

Cl. 29—79.